(12) United States Patent
Wakita et al.

(10) Patent No.: US 8,334,397 B2
(45) Date of Patent: Dec. 18, 2012

(54) PROCESS FOR PRODUCING POLYOXYETHYLENE SORBITAN FATTY ACID ESTER

(75) Inventors: Kazuaki Wakita, Kawasaki (JP); Susumu Tanaka, Kawasaki (JP); Keiichi Maruyama, Kawasaki (JP)

(73) Assignee: NOF Corporation, Tokyo (JP)

( * ) Notice: Subject to any disclaimer, the term of this patent is extended or adjusted under 35 U.S.C. 154(b) by 325 days.

(21) Appl. No.: 12/864,737

(22) PCT Filed: Jan. 28, 2009

(86) PCT No.: PCT/JP2009/051377
§ 371 (c)(1),
(2), (4) Date: Jul. 27, 2010

(87) PCT Pub. No.: WO2009/096433
PCT Pub. Date: Aug. 6, 2009

(65) Prior Publication Data
US 2010/0311996 A1 Dec. 9, 2010

(30) Foreign Application Priority Data
Jan. 28, 2008 (JP) .................................. 2008-016158

(51) Int. Cl.
*C07C 51/00* (2006.01)
(52) U.S. Cl. ........................................................ 554/148
(58) Field of Classification Search ........................ None
See application file for complete search history.

(56) References Cited

FOREIGN PATENT DOCUMENTS

| | | |
|---|---|---|
| EP | 0254376 A1 * | 1/1988 |
| JP | 51-014486 | 2/1976 |
| JP | 63-066151 A | 3/1988 |
| JP | 08-198827 A | 8/1996 |
| JP | 10-505375 A | 5/1998 |
| JP | 2000-237570 A | 9/2000 |
| JP | 2005-023227 A | 1/2005 |
| JP | 2007-091852 A | 4/2007 |

OTHER PUBLICATIONS

JP08-198827, Kao Corp., Production of Quaternary Ammonium Salt, English Translation, 18 pages.*
JP2000-237570, Clariant GMBH, Emulsifier, English Translation, 7 pages.*
Translation of Written Opinion and International Preliminary Examination Report (PCT/ISA/237) issued in PCT/JP2009/051377.
International Search Report (PCT/ISA/210) issued Apr. 14, 2009 in PCT/JP2009/051377.
International Preliminary Examination Report (PCT/ISA/237) issued Apr. 14, 2009 in PCT/JP2009/051377.

* cited by examiner

*Primary Examiner* — Yate K Cutliff
(74) *Attorney, Agent, or Firm* — Sughrue Mion, PLLC

(57) ABSTRACT

A process for producing a polyoxyethylene sorbitan fatty acid ester in which the bitterness just after the production and the bitterness with the lapse of time is suppressed. The process of the invention includes reacting an ester (component A) of a fatty acid having 10 to 22 carbon atoms and a monohydric alcohol having 1 to 3 carbon atoms with at least either (component B) of sorbitol and sorbitan to form a sorbitan fatty acid ester and adding ethylene oxide to the sorbitan fatty acid ester, thereby producing a polyoxyethylene sorbitan fatty acid ester, which is characterized that the following steps (a) to (d) are contained: (a) the component B is provided in the form of a 50 to 90% by weight aqueous solution and mixed with the component A and dehydration was performed until a water content in the system reaches 1.0% by weight or less based on the total weight of the components A and B; (b) 1 to 10% by weight of a monohydric alcohol having 1 to 3 carbon atoms and 0.1 to 1.0% by weight of an alkali catalyst based on the total weight of the components A and B are added at 50 to 90° C.; (c) a transesterification reaction is performed under a nitrogen stream at a reaction temperature of 140 to 190° C. to thereby obtain a sorbitan fatty acid ester; (d) ethylene oxide is added thereto at a reaction temperature of 70 to 130° C.

3 Claims, No Drawings

PROCESS FOR PRODUCING POLYOXYETHYLENE SORBITAN FATTY ACID ESTER

TECHNICAL FIELD

The present invention relates to a process for producing a polyoxyethylene sorbitan fatty acid ester in which an increase in the bitterness with the lapse of time is suppressed.

BACKGROUND ART

A polyoxyethylene sorbitan fatty acid ester obtained by adding ethylene oxide to a sorbitan fatty acid ester which is a partial ester of sorbitol or sorbitan and a fatty acid is known to be excellent in properties such as emulsifying ability, dispersing ability, and wetting ability and has been employed in a wide variety of uses such as cosmetics, lubricants, synthetic resins, and detergents.

Moreover, among the polyoxyethylene sorbitan fatty acid esters, polysorbate 80 is a substance described in Japanese Pharmacopoeia and polysorbates 20, 40, 60, and 65 are substances described in Japanese Pharmaceutical Excipients and they are generally widely used as pharmaceutical additives. Furthermore, in Europe and America, these polysorbates have actual performance of being permitted and have employed as food additives and, also in Japan, are in the course of preparation for permission at an early date as food additives. Thus, the polyoxyethylene sorbitan fatty acid esters have used in a wide range of fields.

However, as physical properties of the polyoxyethylene sorbitan fatty acid esters, they are substances which generally give feeling of bitter taste, oxidation odor, and deterioration odor, for example, as described that "the taste is slightly bitter and slight characteristic odor is present" as properties of polysorbates 40, 60, and 65 in Japanese Pharmaceutical Excipients and polysorbate 80 in Japanese Pharmacopoeia. Therefore, they are avoided in some cases in the fields such as foods and oral cosmetics where their taste is greatly regarded as important.

As production processes for improving the bitterness of the polyoxyethylene sorbitan fatty acid esters, there have been reported a process of performing a steam treatment or a distillation treatment (Patent Document 1) and a process of performing a dehydration-adsorption treatment with a specific adsorbent in the presence of water (Patent Document 2).
Patent Document 1: JP-A-2005-23227
Patent Document 2: JP-A-2007-91852

DISCLOSURE OF THE INVENTION

Problems that the Invention is to Solve

In the processes described in Patent Documents 1 and 2, although the bitterness just after the production has been improved to some degree but the degree has not been sufficiently satisfactory. Furthermore, it has been found that these processes have a problem that bitterness increases with the lapse of time. In the uses such as foods and oral cosmetics, there has been desired a polyoxyethylene sorbitan fatty acid ester in which bitterness does not increase with the lapse of time.

An object of the invention is to provide a process for producing a polyoxyethylene sorbitan fatty acid ester in which the bitterness just after the production is suppressed and also an increase in the bitterness with the lapse of time is suppressed.

Means for Solving the Problems

The present invention relates to a process for producing a polyoxyethylene sorbitan fatty acid ester of the invention comprising reacting an ester (component A) of a fatty acid having 10 to 22 carbon atoms and a monohydric alcohol having 1 to 3 carbon atoms with at least either (component B) of sorbitol and sorbitan to obtain a sorbitan fatty acid ester and adding ethylene oxide to the sorbitan fatty acid ester, thereby producing a polyoxyethylene sorbitan fatty acid ester, which comprises:

(a) a step of providing the component B in the form of a 50 to 90% by weight aqueous solution, mixing it with the component A, and performing dehydration until a water content in the system reaches 1.0% by weight or less based on the total weight of the components A and B;

(b) a step of adding 1 to 10% by weight of a monohydric alcohol having 1 to 3 carbon atoms and 0.1 to 1.0% by weight of an alkali catalyst based on the total weight of the components A and B at 50 to 90° C.;

(c) a step of performing a transesterification reaction under a nitrogen stream at a reaction temperature of 140 to 190° C. to thereby obtain a sorbitan fatty acid ester; and (d) a step of adding ethylene oxide to the sorbitan fatty acid ester at a reaction temperature of 70 to 130° C.

Advantage of the Invention

The polyoxyethylene sorbitan fatty acid ester obtained by the invention shows not only an improvement in the bitterness just after the production and also suppression of an increase in the bitterness with the lapse of time, so that it can be most suitably used in foods, cosmetics, medicated cosmetics, and medicines.

BEST MODE FOR CARRYING OUT THE INVENTION

The following will describe the invention in detail.

In the invention, a polyoxyethylene sorbitan fatty acid ester is obtained by reacting at least one kind of fatty acid ester (component A) of a fatty acid having 10 to 22 carbon atoms and a monohydric alcohol having 1 to 3 carbon atoms with sorbitol and/or sorbitan (component B) to obtain a sorbitan fatty acid ester and adding ethylene oxide thereto.
(Regarding Fatty Acid Ester)

The fatty acid ester as (component A) of the invention is an ester of a saturated or unsaturated fatty acid having 10 to 22 carbon atoms and a monohydric alcohol having 1 to 3 carbon atoms. In this case, the fatty acid may be a natural fatty acid or a synthetic fatty acid, may be saturated one or unsaturated one, and further may be linear one or branched one. Specific examples of such a fatty acid include capric acid, lauric acid, myristic acid, palmitic acid, margaric acid, stearic acid, arachidic acid, behenic acid, palmitoleic acid, oleic acid, erucic acid, isostearic acid, and the like. Preferred is a saturated or unsaturated linear fatty acid having 10 to 18 carbon atoms.

On the other hand, as the monohydric alcohol having 1 to 3 carbon atoms for esterifying the above-described fatty acid, there may be, for example, mentioned methanol, ethanol, isopropanol, n-propanol, and the like, and may be preferably methanol and ethanol, more preferably methanol.
(Regarding Sorbitol and/or Sorbitan)

As sorbitol and/or sorbitan as (component B) of the invention, commercially available one can be used. Moreover, from the viewpoint of influence on color-tone deterioration, odor, bitterness, and the like, the aldehyde content of (component B) is preferably 50 ppm or less.

The aldehyde content of (component B) can be reduced by treatment with an appropriate adsorbent. As the adsorbent, one containing a composite metal oxide activated by baking can be suitably used and the purpose can be achieved by a silica/alumina-based adsorbent, zeolite, hydrotalcite, magnesium oxide/aluminum oxide composite metal oxide, or the like.

(Measurement Method of Aldehyde Content)

The aldehyde content of sorbitol and/or sorbitan can be measured by the method shown below.

(1) One gram of a sample is placed in a test tube with ground-in stopper and a fuchsine sulfite solution (Note 1) is added, followed by tight sealing. They are mixed and allowed to stand at room temperature for 30 minutes.

(2) Absorbance of the solution at a wavelength of 562 nm and a cell width of 10 mm is measured by means of an ultraviolet-visible spectrophotometer (FT/IR-410 manufactured by JASCO Corporation).

(3) A blank test is performed in the same manner using 1 g of water instead of the sample solution and absorbance on this occasion is 0 (standard).

(4) The same operations are performed using a formaldehyde standard solution (Note 2) to prepare a calibration curve and the content of the aldehyde contained in the sample is determined from the calibration curve.

(Note 1: Preparation of Fuchsine Sulfite Solution)

Basic fuchsine (200 mg) is weighed into 200 mL of a messflask and 120 mL of warm water is added to dissolve the fuchsine, followed by standing to cool. A solution obtained by dissolving 2 g of anhydrous sodium sulfite in 20 mL of water and 2 mL of hydrochloric acid are added thereto and the whole is diluted to a marked line with water. The solution is allowed to stand for at least 1 hour before use, and disappearance of pink color is confirmed.

(Note 2: Preparation of Formaldehyde Standard Solutions)

Solutions having a formaldehyde concentration of 1 ppm, 10 ppm, 50 ppm, and 100 ppm are prepared and they are used as standard solutions for calibration curve preparation.

(Transesterification Reaction of Sorbitol and/or Sorbitan with Fatty Acid Ester)

As a production step of the sorbitan fatty acid ester of the invention, there is a step (step a) of providing (component B) as a 50 to 90% by weight aqueous solution and performing dehydration until the water content in the reaction system reaches 1.0% by weight or less based on the total weight of (component A) and (component B).

Sorbitol is a solid and sorbitan is a highly viscous liquid at ordinary temperature. Therefore, when the compound is mixed with a fatty acid ester as it is, it aggregates in the fatty acid ester. Thus, it is necessary that (component B) be mixed as an aqueous solution with the fatty acid ester and water in the reaction system be gradually removed by dehydration.

The conditions for dehydration thereafter are not particularly limited but the dehydration can be performed under a nitrogen atmosphere at 90 to 110° C. under 20 kPa or less for a short period of time. In the case where the water content after the dehydration exceeds 1.0% by weight, the fatty acid ester is partially hydrolyzed to generate a fatty acid, so that the reactivity decreases. In this case, a caramel-like substance is excessively formed by heat hysteresis owing to an increase in the reaction time, consequently causing bitterness.

Next, there is a step (step b) of adding 1 to 10% by weight of a monohydric alcohol having 1 to 3 carbon atoms and 0.1 to 1.0% by weight of an alkali catalyst at 50 to 90° C. based on the total weight of (component A) and (component B). In the transesterification reaction between (component A) and (component B), the reaction in a heterogeneous state at an early stage is a rate-determining step and the reaction rate at the early reaction step can be enhanced by adding the monohydric alcohol having 1 to 3 carbon atoms.

As the monohydric alcohol having 1 to 3 carbon atoms, there may be, for example, mentioned methanol, ethanol, isopropanol, n-propanol, and the like, and may be preferably methanol and ethanol, more preferably methanol. In the case of a monohydric alcohol having 4 or more carbon atoms or a polyhydric alcohol, it has a high boiling point and thus there is a risk that it may remain in a product, so that the case is not preferred.

The amount of the monohydric alcohol having 1 to 3 carbon atoms to be added is 1 to 10% by weight, preferably 2 to 8% by weight, and more preferably 3 to 6% by weight based on the total amount of (component A) and (component B). When the amount is less than 1% by weight, the reaction promoting effect in a heterogeneous state at an early stage is insufficient. When the amount exceeds 10% by weight, not only the reaction promoting effect is not obtained but also a large amount of the monohydric alcohol should be recovered and a risk that the monohydric alcohol may remain in the product increases, so that the case is not preferred.

Moreover, the temperature for adding the monohydric alcohol having 1 to 3 carbon atoms is 50 to 90° C. and preferably, it is preferred to add it at a temperature lower than the boiling point of the monohydric alcohol to be added. In the case where the temperature for the addition is lower than 50° C., the viscosity of (component B) increases and the stirring efficiency lowers. In the case where the temperature exceeds the boiling point of the monohydric alcohol, there is a risk of bumping of the monohydric alcohol, so that the case is not preferred in view of working safety.

The amount of the alkali catalyst to be added in (step b) is 0.1 to 1.0% by weight, preferably 0.2 to 0.9% by weight, and more preferably 0.3 to 0.8% by weight based on the total amount of (component A) and (component B). In the case where the amount of the alkali catalyst is less than 0.1% by weight, the reaction rate is remarkably lowered. In the case where the amount exceeds 1.0% by weight, the caramel-like substance is exceedingly formed, consequently causing bitterness. Specific examples of the alkali catalyst include sodium hydroxide, potassium hydroxide, sodium methoxide, sodium carbonate, and the like. Preferred is sodium methoxide. Moreover, the alkali catalyst may be dissolved in the monohydric alcohol having 1 to 3 carbon atoms beforehand and then added or may be added separately. However, when the solubility of the alkali catalyst in the reaction system is considered, it is rather preferred that both substances be dissolved beforehand and then added.

After the addition of the alkali catalyst and the monohydric alcohol having 1 to 3 carbon atoms, there is a step (step c) of performing transesterification reaction at a reaction temperature of 140 to 190° C. under a nitrogen stream. The reaction temperature is preferably 150 to 185° C. and more preferably 160 to 180° C. In the case where the reaction temperature is lower than 140° C., the reaction rate is remarkably lowered and the caramel-like substance is exceedingly formed by heat hysteresis owing to an increase in the reaction time, consequently causing bitterness. Also in the case where the temperature exceeds 190° C., the caramel-like substance is formed by condensation of sorbitan and sorbitol, consequently causing bitterness.

With regard to the reaction pressure in (step c), the reaction may be performed at normal pressure but the reaction rate can be enhanced by performing the reaction at 1 to 20 kPa. The pressure at the reaction is preferably 2 to 15 kPa and more preferably 3 to 10 kPa. When the reaction pressure exceeds 20 kPa, the effect of enhancing the reaction rate decreases.

(Regarding Sorbitan Fatty Acid Ester)

The ratio of (component A) to (component B) used in the invention varies depending on the average degree of substitution (degree of esterification) of the objective sorbitan fatty acid ester but it is preferred to use (component A) in an amount of 0.5 to 3.5 molar equivalents, preferably 1.0 to 2.0 molar equivalents. Depending on the difference in the degree of esterification, the ester is classified into a sorbitan monofatty acid ester, a sorbitan sesquifatty acid ester, a sorbitan difatty acid ester, a sorbitan trifatty acid ester, or the like.

(Regarding EO Addition Reaction and Purification)

The polyoxyethylene sorbitan fatty acid ester of the invention is obtained by adding ethylene oxide to a sorbitan fatty acid ester.

The average number of moles of added ethylene oxide is preferably 1 to 50, particularly in the case of use as food additives, further preferably 15 to 25, and most preferably 20. In the addition reaction of ethylene oxide to the sorbitan fatty acid ester, catalysts hitherto known can be used without particular limitation and, for example, an alkali metal catalyst such as potassium hydroxide, sodium hydroxide, or sodium methoxide, fatty acid soaps, and the like are employed. The reaction temperature for the addition reaction of ethylene oxide is 70 to 130° C., more preferably 80 to 120° C., and further preferably 90 to 110° C. When the reaction temperature is lower than 70° C., the reaction hardly proceeds and when the temperature is higher than 130° C., such a temperature causes bitterness of the product. Moreover, the reaction pressure is preferably 0.1 to 0.8 MPa, and further preferably 0.1 to 0.4 MPa.

In the invention, in order to neutralize the alkali catalyst contained in the polyoxyethylene sorbitan fatty acid ester obtained after the addition reaction of ethylene oxide, a mineral acid such as phosphoric acid or sulfuric acid, a short-chain aliphatic monocarboxylic acid such as formic acid, acetic acid, caproic acid, or lactic acid, a polybasic carboxylic acid such as oxalic acid, succinic acid, malic acid, adipic acid, or citric acid, an aromatic monocarboxylic acid such as benzoic acid or salicylic acid, an aromatic polybasic acid such as phthalic acid, terephthalic acid, or isophthalic acid, or the like may be added, salting-out and washing with water may be performed, or a treatment with an ion-exchange resin may be performed. These treatments may be performed with repeating each operation or with doubly performing different treatments. Furthermore, if necessary, purification with a discoloration treatment, removal of water and solvents, steam deodorization, ion exchange resin, or active carbon may be performed or when an unnecessary substance is present, it may be removed by centrifugation or filtration.

The polyoxyethylene sorbitan fatty acid ester obtained through the addition reaction of ethylene oxide and subsequent neutralization and purification is classified depending on the kind of the fatty acid and the difference in the degree of esterification. For example, one obtained by addition of 20 moles of ethylene oxide to sorbitan monolaurate is called "polyoxyethylene (20) sorbitan monolaurate (polysorbate 20)", one obtained by addition of 20 moles of ethylene oxide to sorbitan monostearate is called "polyoxyethylene (20) sorbitan monostearate (polysorbate 60)", one obtained by addition of 20 moles of ethylene oxide to sorbitan tristearate is called "polyoxyethylene (20) sorbitan tristearate (polysorbate 65)", and one obtained by addition of 20 moles of ethylene oxide to sorbitan monooleate is called "polyoxyethylene (20) sorbitan monooleate (polysorbate 80)".

In the invention, in order to prevent the deterioration with the lapse of time after neutralization and purification of the polyoxyethylene sorbitan fatty acid ester, one kind or two or more kinds of antioxidants such as sorbic acid, dibutylhydroxytoluene, dibutylhydroxyanisole, propyl gallate, isopropyl citrate, guaiacic acid, disodium ethylenediaminetetraacetate, and dl-α-tocopherol can be added.

Since the bitterness just after production and an increase in the bitterness with the lapse of time in the polyoxyethylene sorbitan fatty acid ester of the invention are small as compared with those in conventional one, the polyoxyethylene sorbitan fatty acid ester can be suitably used in medicines, medicated cosmetics, cosmetics, food uses, and the like, particularly in food uses.

EXAMPLES

The following will describe the invention further in detail with reference to Examples and Comparative Examples. With regard to respective synthetic products, sensory evaluation on the bitterness just after synthesis and the bitterness after 6 months from the synthesis (under storage at 25° C.) was performed. Synthetic conditions and evaluation results are shown in Table 1.

Example 1

Synthesis of Polyoxyethylene (20) Sorbitan Monooleate

After 469 g of a 70% by weight sorbitan aqueous solution (aldehyde value of sorbitan: 5.0 ppm) and 947 g of methyl oleate were charged into a 2000 mL four-neck flask fitted with a stirring apparatus, a thermometer, and a nitrogen gas inlet, dehydration was performed at 110° C. under a nitrogen stream at normal pressure for 1 hour and further at 110° C. under a nitrogen stream at 4 kPa for 1 hour. The whole was cooled to 65° C. and, after 51.0 g of a 10% by weight sodium methoxide methanol solution and 0.64 g of sodium hypophosphite were added thereto, the temperature was raised under a nitrogen stream at normal pressure to 170° C. as a reaction temperature. After the temperature reached 170° C., the pressure was reduced to 6.5 kPa and the reaction was carried out under a nitrogen stream. At the time point when the spot of methyl oleate as a raw material disappeared on thin-layer chromatography, it was judged that the reaction was completed. The time required for the reaction was 8 hours and, after the completion of the reaction was confirmed, the mixture was filtrated at 80° C. to obtain sorbitan monooleate.

(Measurement Conditions for Thin-Layer Chromatography)

TLC plate: silica gel 60 manufactured by Merck & Co., Inc.

Developing solvent: chloroform/n-butanol=97/3 (v/v)

Diluent solvent: chloroform

Dilution concentration: a sample (sorbitan fatty acid ester) solution=1 w/v % a standard (fatty acid methyl ester) solution=0.1 w/v %

Spotting amount: 1 μL

Color-developing solution: a phosphoric acid/copper sulfate aqueous solution (156 g of copper sulfate pentahydrate and 135 g of an 85% by weight of phosphoric acid aqueous solution is weighed into a 1 L messflask and diluted to the marked line)

Color-developing method: the phosphoric acid/copper sulfate aqueous solution is applied and, after drying, is heated in a constant-temperature chamber at 170° C. for 15 minutes.

Into an autoclave was charged 668 g of sorbitan monooleate obtained by the transesterification reaction. After the atmosphere in the autoclave was replaced with dry nitrogen, the compound was heated to 100° C. with stirring. Subsequently, 1332 g of ethylene oxide was added dropwise at 100° C. by means of a dropping apparatus to cause a reaction and the whole was stirred for 2 hours as it was to complete the reaction. The reaction composition was taken out of the autoclave and was neutralized with an 85% by weight phosphoric acid aqueous solution to adjust the pH to 6 to 7. Thereafter, in order to remove water contained therein, dehydration was performed at 100° C. under a nitrogen stream at 6.5 kPa for 1 hour. The product was filtrated at 80° C. to obtain polyoxyethylene (20) sorbitan monooleate.

Example 2

Synthesis of Polyoxyethylene (20) Sorbitan Monostearate

After 469 g of a 70% by weight sorbitan aqueous solution (aldehyde value of sorbitan: 7.4 ppm) and 872 g of methyl stearate were charged into a 2000 mL four-neck flask fitted with a stirring apparatus, a thermometer, and a nitrogen gas inlet, dehydration was performed at 110° C. under a nitrogen stream at normal pressure for 1 hour and further at 110° C. under a nitrogen stream at 4 kPa for 1 hour. The whole was cooled to 65° C. and, after 30.0 g of a 20% by weight sodium methoxide methanol solution and 0.06 g of sodium hypophosphite were added thereto, was heated under a nitrogen stream at normal pressure to 190° C. as a reaction temperature. After the temperature reached 190° C., pressure was reduced to 6.5 kPa and the reaction was carried out under a nitrogen stream. At the time point when the spot of methyl stearate as a raw material disappeared on thin-layer chromatography, it was judged that the reaction was completed. The reaction time was 5 hours and, after the completion of the reaction was confirmed, the mixture was filtrated at 80° C. to obtain sorbitan monostearate.

Into an autoclave was charged 642 g of sorbitan monostearate obtained by the transesterification reaction. After the atmosphere in the autoclave was replaced with dry nitrogen, the compound was heated to 100° C. with stirring. Subsequently, 1358 g of ethylene oxide was added dropwise at 100° C. by means of a dropping apparatus to cause a reaction and the whole was stirred for 2 hours as it was to complete the reaction. The reaction composition was taken out of the autoclave and was neutralized with an 85% by weight phosphoric acid aqueous solution to adjust the pH to 6 to 7. Thereafter, in order to remove water contained therein, dehydration was performed at 100° C. under a nitrogen stream at 6.5 kPa for 1 hour. The product was filtrated at 80° C. to obtain polyoxyethylene (20) sorbitan monostearate.

Example 3

Synthesis of Polyoxyethylene (20) Sorbitan Monolaurate

After 469 g of a 70% by weight sorbitan aqueous solution (aldehyde value of sorbitan: 6.5 ppm) and 556 g of methyl laurate were charged into a 2000 mL four-neck flask fitted with a stirring apparatus, a thermometer, and a nitrogen gas inlet, dehydration was performed at 110° C. under a nitrogen stream at normal pressure for 1 hour and further at 110° C. under a nitrogen stream at 4 kPa for 1 hour. The whole was cooled to 65° C. and, after 35.4 g of a 5% by weight sodium methoxide methanol solution and 0.44 g of sodium hypophosphite were added thereto, was heated under a nitrogen stream at normal pressure to 150° C. as a reaction temperature. After the temperature reached 150° C., the reaction was carried out under a nitrogen stream at normal pressure. At the time point when the spot of methyl laurate as a raw material disappeared on thin-layer chromatography, it was judged that the reaction was completed. The reaction time was 8 hours and, after the completion of the reaction was confirmed, the product was filtrated at 80° C. to obtain sorbitan monolaurate.

Into an autoclave was charged 574 g of sorbitan monolaurate obtained by the transesterification reaction. After the atmosphere in the autoclave was replaced with dry nitrogen, the compound was heated to 100° C. with stirring. Subsequently, 1426 g of ethylene oxide was added dropwise at 100° C. by means of a dropping apparatus to cause a reaction and the whole was stirred for 2 hours as it was to complete the reaction. The reaction composition was taken out of the autoclave and was neutralized with an 85% by weight phosphoric acid aqueous solution to adjust the pH to 6 to 7. Thereafter, in order to remove water contained therein, dehydration was performed at 100° C. under a nitrogen stream at 6.5 kPa for 1 hour. The product was filtrated at 80° C. to obtain polyoxyethylene (20) sorbitan monolaurate.

Example 4

Synthesis of Polyoxyethylene (20) Sorbitan Monooleate

After 469 g of a 70% by weight sorbitan aqueous solution (aldehyde value of sorbitan: 5.0 ppm) and 947 g of methyl oleate were charged into a 2000 mL four-neck flask fitted with a stirring apparatus, a thermometer, and a nitrogen gas inlet, dehydration was performed at 110° C. under a nitrogen stream at normal pressure for 1 hour and further at 110° C. under a nitrogen stream at 4 kPa for 1 hour. The whole was cooled to 65° C. and, after 51.0 g of a 10% by weight sodium methoxide methanol solution and 0.64 g of sodium hypophosphite were added thereto, was heated under a nitrogen stream at normal pressure to 180° C. as a reaction temperature. After the temperature reached 180° C., the reaction was carried out under a nitrogen stream at normal pressure. At the time point when the spot of methyl oleate as a raw material disappeared on thin-layer chromatography, it was judged that the reaction was completed. The reaction time was 12 hours and, after the completion of the reaction was confirmed, the product was filtrated at 80° C. to obtain sorbitan monooleate.

Into an autoclave was charged 668 g of sorbitan monooleate obtained by the transesterification reaction. After the atmosphere in the autoclave was replaced with dry nitrogen, the compound was heated to 120° C. with stirring. Subsequently, 1332 g of ethylene oxide was added dropwise at 120° C. by means of a dropping apparatus to cause a reaction and the whole was stirred for 2 hours as it was to complete the reaction. The reaction composition was taken out of the autoclave and was neutralized with an 85% by weight phosphoric acid aqueous solution to adjust the pH to 6 to 7. Thereafter, in order to remove water contained therein, dehydration was performed at 100° C. under a nitrogen stream at 6.5 kPa for 1 hour. The product was filtrated at 80° C. to obtain polyoxyethylene (20) sorbitan monooleate.

Comparative Example 1

Synthesis of Polyoxyethylene (20) Sorbitan Monooleate

After 497 g of a 70% by weight sorbitol aqueous solution (aldehyde value of sorbitol: 5.0 ppm), 863 g of oleic acid, 3.0 g of sodium carbonate, and 1.7 g of sodium hypophosphite were charged into a 2000 mL four-neck flask fitted with a stirring apparatus, a thermometer, and a nitrogen gas inlet, replacement with nitrogen was performed at room temperature for 30 minutes. Thereafter, the temperature was raised stepwise to 110° C., 140° C., and 170° C. After the temperature reached 170° C. as a reaction temperature, the pressure was reduced to 6.5 kPa and the reaction was carried out under a nitrogen stream. At the time point when the spot of oleic acid as a raw material disappeared on thin-layer chromatography, it was judged that the reaction was completed. The reaction time was 20 hours and, after the completion of the reaction was confirmed, the product was filtrated at 80° C. to obtain sorbitan monooleate.

Into an autoclave were charged 668 g of sorbitan monooleate and 1.0 g of sodium hydroxide as a catalyst. After the atmosphere in the autoclave was replaced with dry nitrogen, the catalyst was completely dissolved at 100° C. with stirring. Subsequently, 1332 g of ethylene oxide was added dropwise at 100° C. by means of a dropping apparatus to cause a reaction and the whole was stirred for 2 hours as it was to complete the reaction. The reaction composition was taken out of the autoclave and was neutralized with an 85% by weight phosphoric acid aqueous solution to adjust the pH to 6 to 7. Thereafter, in order to remove water contained therein, dehydration was performed at 100° C. under a nitrogen stream at 6.5 kPa for 1 hour. The product was filtrated to obtain polyoxyethylene (20) sorbitan monooleate.

Comparative Examples 2 to 8

Synthesis of Polyoxyethylene (20) Sorbitan Monooleate

The polyoxyethylene (20) sorbitan monooleate shown in Comparative Examples 2 to 8 was formed under the conditions shown in Table 1 based on the synthetic example of Example 1.

Comparative Example 9

Synthesis of Polyoxyethylene (20) Sorbitan Monooleate

After 497 g of a 70% by weight sorbitol aqueous solution (aldehyde value of sorbitol: 5.0 ppm), 863 g of oleic acid, 3.0 g of sodium carbonate, and 1.7 g of sodium hypophosphite were charged into a 2000 mL four-neck flask fitted with a stirring apparatus, a thermometer, and a nitrogen gas inlet, replacement with nitrogen was performed at room temperature for 30 minutes. Thereafter, the temperature was raised stepwise to 110° C., 140° C., 190° C., and 230° C. After the temperature reached 230° C. as a reaction temperature, the reaction was carried out under a nitrogen stream at normal pressure. At the time point when the spot of oleic acid as a raw material disappeared on thin-layer chromatography, it was judged that the reaction was completed. The reaction time was 5 hours and, after the completion of the reaction was confirmed, the product was filtrated at 80° C. to obtain sorbitan monooleate.

To 1000 g of monooleic acid obtained by the esterification, 50 g of water and 20 g of Kyoward 2000 (manufactured by Kyowa Chemical Industry Co., Ltd., magnesium oxide: 60% by weight, aluminum oxide: 30% by weight, content of composite metal oxide: 90% by weight, loss on drying: 0.8% by weight) were added, and the whole was treated at 80° C. for 1 hour under a nitrogen stream with stirring. Then, the product was treated at 6.5 kPa at 100° C. for 1 hour to remove water and the adsorbent was removed by filtration.

Into an autoclave were charged 668 g of sorbitan monooleate treated with the adsorbent and 1.0 g of sodium hydroxide as a catalyst. After the atmosphere in the autoclave was replaced with dry nitrogen, the catalyst was completely dissolved at 100° C. with stirring. Subsequently, 1332 g of ethylene oxide was added dropwise at 100° C. by means of a dropping apparatus to cause a reaction and the whole was stirred for 2 hours as it was to complete the reaction. The reaction composition was taken out of the autoclave and was neutralized with an 85% by weight phosphoric acid aqueous solution to adjust the pH to 6 to 7. Thereafter, in order to remove water contained therein, dehydration was performed at 100° C. under a nitrogen stream at 6.5 kPa for 1 hour. The product was filtrated to obtain polyoxyethylene (20) sorbitan monooleate.

To 500 g of polyoxyethylene (20) sorbitan monooleate synthesized, 25 g of water and 10 g of Kyoward 2000 were added, and dehydration was performed at 80° C. under a nitrogen stream at normal pressure for 1 hour and at 110° C. under a nitrogen stream at 6.5 kPa for 1 hour. The product was filtrated at 80° C. to remove the adsorbent, thereby obtaining a synthetic product.

Comparative Example 10

Synthesis of Polyoxyethylene (20) Sorbitan Monooleate

Into 500 g of polyoxyethylene (20) sorbitan monooleate before adsorbent treatment synthesized in Comparative Example 9 was introduced 50 g of steam under conditions of 120° C. and 6.5 kPa, thereby performing steam treatment. Thereafter, dehydration was performed at 110° C. at 4 kPa under a nitrogen stream for 1 hour and the product was filtrated at 80° C. to obtain a synthetic product.

[Sensory Evaluation Regarding Bitterness]

With regard to the above Examples and Comparative Examples, sensory evaluation of each synthetic product regarding bitterness was performed by 10 panelists, within 3 days after synthesis and after 6 months from synthesis (storage at 25° C.). For comparative measurement of bitterness, evaluation was performed by placing the polyoxyethylene sorbitan fatty acid ester directly on the tongue, evaluating bitterness felt as the following 5 stages when it was tasted for about 10 seconds, and summing the scores provided by individual monitors.

1: bitterness is hardly felt

2: bitterness slightly remains

3: bitterness remains to some extent

4: slightly strong bitterness remains

5: strong bitterness remains

[Evaluation Criteria]

In the case where the average value obtained from the 5 stage evaluation done by 10 panelists was 1.0 or more and 3.0 or less, it was evaluated that bitterness is little and the ester was suitable in uses for keeping it in the mouth (shown as "Good" in Table 1). On the other hand, in the case where the value is 3.0 or more and 5.0 or less, it was evaluated that bitterness was felt and the ester was not suitable in uses for keeping it in the mouth (shown as "Bad" in Table 1).

TABLE 1

| | Synthetic product Note 1 | Synthetic process Note 2 | Step a Water content after dehydration | Step b Amount of methanol added (wt %) | Step b Amount of catalyst Note 3 (Wt %) | Step c Reaction temperature (° C.) | Step c Reaction pressure (kPa) | Step c Reaction time (hour) Note 4 |
|---|---|---|---|---|---|---|---|---|
| Example 1 | 1 | A | 0.10 | 3.6 | 0.4 | 170 | 6.5 | 8 |
| Example 2 | 2 | A | 0.12 | 2.0 | 0.5 | 190 | 6.5 | 5 |
| Example 3 | 3 | A | 0.25 | 3.8 | 0.2 | 150 | Normal Pressure | 8 |
| Example 4 | 1 | A | 0.10 | 3.6 | 0.4 | 180 | Normal Pressure | 12 |
| Comparative Example 1 | 1 | B | 0.15 | 4.0 | 0.25 | 170 | 6.5 | 20 |
| Comparative Example 2 | 1 | A | 2.50 | 3.6 | 0.4 | 170 | 6.5 | 17 |
| Comparative Example 3 | 1 | A | 0.15 | 0.0 | 0.4 | 170 | 6.5 | 15 |
| Comparative Example 4 | 1 | A | 0.20 | 4.95 | 0.05 | 170 | 6.5 | 25 |
| Comparative Example 5 | 1 | A | 0.13 | 2.5 | 2.5 | 170 | 6.5 | 5 |
| Comparative Example 6 | 1 | A | 0.10 | 3.6 | 0.4 | 110 | 6.5 | 30 |
| Comparative Example 7 | 1 | A | 0.12 | 3.6 | 0.4 | 230 | 6.5 | 4 |
| Comparative Example 8 | 1 | A | 0.11 | 3.6 | 0.4 | 170 | 6.5 | 8 |
| Comparative Example 9 | 1 | B | 0.14 | — | 0.25 | 230 | Normal Pressure | 5 |
| Comparative Example 10 | 1 | B | 0.11 | — | 0.25 | 230 | Normal Pressure | 5 |

| | Step d Reaction temperature | Aldehyde content of Component B (ppm) | Just after synthesis Bitterness Score | Just after synthesis Judgment | After 6 months Bitterness Score | After 6 months Judgment |
|---|---|---|---|---|---|---|
| Example 1 | 100 | 5.0 | 13 | Good | 15 | Good |
| Example 2 | 100 | 7.4 | 14 | Good | 14 | Good |
| Example 3 | 100 | 6.5 | 20 | Good | 21 | Good |
| Example 4 | 120 | 5.0 | 25 | Good | 26 | Good |
| Comparative Example 1 | 100 | 5.0 | 35 | Bad | 38 | Bad |
| Comparative Example 2 | 100 | 5.0 | 32 | Bad | 35 | Bad |
| Comparative Example 3 | 100 | 5.0 | 28 | Good | 34 | Bad |
| Comparative Example 4 | 100 | 5.0 | 38 | Bad | 42 | Bad |
| Comparative Example 5 | 100 | 5.0 | 37 | Bad | 41 | Bad |
| Comparative Example 6 | 100 | 5.0 | 35 | Bad | 40 | Bad |
| Comparative Example 7 | 100 | 5.0 | 33 | Bad | 36 | Bad |
| Comparative Example 8 | 150 | 5.0 | 35 | Bad | 39 | Bad |
| Comparative Example 9 | 100 | 5.0 | 22 | Good | 32 | Bad |
| Comparative Example 10 | 100 | 5.0 | 28 | Good | 36 | Bad |

Note 1:
1: Polyoxyethylene (20) sorbitan monooleate
2: Polyoxyethylene (20) sorbitan monostearate
3: Polyoxyethylene (20) sorbitan monolaurate Note 2:
A: Transesterification method (a method of reacting a fatty acid methyl ester with a sugar)
B: Direct acid method (a method of reacting a fatty acid with a sugar)

Note 3:
Sodium carbonate in Comparative Examples 1, 9, and 10 and sodium methoxide in other examples Note 4:
Time until the spot of the fatty acid methyl ester (in the case of transesterification) or the fatty acid (in the case of direct acid method) as a raw material disappears on thin-layer chromatography In Examples 1 to 4, not only the bitterness just after synthesis but also the bitterness after the lapse of 6 months are reduced in all cases.

Comparative Examples 1, 2, and 4 to 8 are performed under out of the conditions of the invention and bitterness was felt just after synthesis in all cases.

In Comparative Example 3, methanol is not added at the time when the catalyst is added. In this case, the bitterness just after synthesis was reduced but the bitterness after the lapse of 6 months remarkably increased.

In Comparative Example 9, as in Patent Document 2, the sorbitan fatty acid ester is produced by the direct acid method, followed by a purification treatment with Kyoward. In this case, bitterness was reduced just after synthesis by the purification treatment. However, after the lapse of 6 months, it was found that bitterness increased.

In Comparative Example 10, as in Patent Document 1, the sorbitan fatty acid ester is produced by the direct acid method, followed by a purification treatment with steam. In this case, bitterness was reduced just after synthesis by the purification treatment. However, after the lapse of 6 months, it was found that bitterness increased.

While the invention has been described in detail and with reference to specific embodiments thereof, it will be apparent to one skilled in the art that various changes and modifications can be made therein without departing from the spirit and scope thereof.

The present application is based on Japanese Patent Application No. 2008-016158 filed on Jan. 28, 2008, and the contents are incorporated herein by reference. Also, all the references are incorporated as a whole.

The invention claimed is:

1. A process for producing a polyoxyethylene sorbitan fatty acid ester comprising reacting an ester (component A) of a fatty acid having 10 to 22 carbon atoms and a monohydric alcohol having 1 to 3 carbon atoms with at least either (component B) of sorbitol and sorbitan to obtain a sorbitan fatty acid ester and adding ethylene oxide to the sorbitan fatty acid ester, thereby producing a polyoxyethylene sorbitan fatty acid ester, which comprises:
   (a) a step of providing the component B in the form of a 50 to 90% by weight aqueous solution to mixing it with the component A, and performing dehydration until a water content in the system reaches 1.0% by weight or less based on a total weight of the components A and B;
   (b) a step of adding 1 to 10% by weight of a monohydric alcohol having 1 to 3 carbon atoms and 0.1 to 1.0% by weight of an alkali catalyst based on the total weight of the components A and B at 50 to 90° C.;
   (c) a step of performing a transesterification reaction under a nitrogen stream at a reaction temperature of 140 to 190° C. to obtain a sorbitan fatty acid ester; and
   (d) a step of adding ethylene oxide to the sorbitan fatty acid ester at a reaction temperature of 70 to 130° C.

2. The process according to claim 1, wherein the transesterification reaction in the step (c) is performed under a reduced pressure of 1 to 20 kPa.

3. The process according to claim 1 or 2, wherein an aldehyde content of the component B is 50 ppm or less.

* * * * *